June 4, 1963  E. F. TURNER ET AL  3,091,807

BIAXIAL ORIENTATION METHOD AND APPARATUS

Filed Oct. 6. 1960

INVENTORS
ERNEST F. TURNER
PETER H. HOFER
BY Walter C. Kehm
ATTORNEY

United States Patent Office 3,091,807
Patented June 4, 1963

3,091,807
BIAXIAL ORIENTATION METHOD AND
APPARATUS
Ernest F. Turner, Marietta, Ohio, and Peter H. Hofer, Berkeley Heights, N.J., assignors to Union Carbide Corporation, a corporation of New York
Filed Oct. 6, 1960, Ser. No. 60,976
8 Claims. (Cl. 18—14)

This invention relates to improved method and apparatus for biaxially orienting extruded tubular film. More particularly the invention relates to an improvement in tubular die extrusion and to an apparatus which provides increased permanent orientation in extruded tubular film.

Biaxially oriented thermoplastic films have long been known to have physical properties superior to nonoriented films, particularly heat shrinkability, tensile strength, and impact strength. Biaxial orientation is conventionally carried out by extruding thermoplastic tubing, expanding the tubing by passing it over a bubble of fluid medium "trapped" between the die orifice and a pair of nip rolls spaced from the die. To achieve permanent orientation by this method the thermoplastic must be expanded while within a critical temperature range. This range, which varies from one thermoplastic to another in both breadth and temperature values, is delimited at the lower end by the temperature at which the thermoplastic film is sufficiently set or hardened so that no expansion or stretching thereof occurs, and at the upper end by the temperature at which the thermoplastic is so fluid that the polymer molecules relax after removal of the stretching force i.e., after passage over the trapped bubble, so that no permanent orientation results.

In heretofore known tubular film extrusion and orientation methods and apparatus the degree of orientation, particularly in the transverse direction, has been limited by an inability to cool the thermoplastic to within the orientation temperature range prior to expansion by the trapped bubble. As a result, in prior art processes the film is expanded while too hot and less than all of the stretching imparted by the bubble results in permanent orientation.

In typical prior art methods the tubular film is expanded as it emerges from the die orifice, and is only thereafter cooled by a cooling ring maintained at temperatures considerably below the orientation temperature of the extruded thermoplastic. Because in these methods tubing is expanded immediately upon emergence of the film from the die, and before cooling to within the orientation temperature range can occur, only a portion of the orientation is retained. Maximum orientation of the thermoplastic film is not realized and maximum film properties are not obtained. Use of a forced air cooling system prior to the cooling ring does not substantially improve the amount of permanent orientation achieved because the film is expanded even before an air blast can be effective.

It is an object, therefore, of the present invention to provide improved method and apparatus for biaxially orienting extruded tubular thermoplastic film wherein the tubular film is maintained essentially unexpanded until its temperature is within its orientation temperature range.

These and other objects of the present invention are achieved by maintaining extruded thermoplastic tubing at a substantially constant diameter for a distance from the die orifice and simultaneously subjecting the tubing to a cooling environment, peripherally contacting the tubing in a plane parallel to and spaced said distance from the die orifice with an essentially line contact such as is provided by an annular knife-edge substantially equal in diameter to the die orifice, the said distance being sufficient to permit the tubing to be cooled to within the orientation temperature range, and thereafter expanding and drawing the tubing to impart machine and transverse direction orientation.

Improved tubular film extrusion apparatus is also provided. The apparatus comprises an extruder fitted with a die having an annular die orifice for forming thermoplastic tubing, and spaced from the die orifice and in a plane parallel thereto an annular knife-edge substantially equal in diameter to the die orifice circumscribing the tubing and adapted to bear against the periphery thereof in a line contact, means for cooling the tubing to a temperature within the orientation temperature range between the die orifice and the annular knife-edge and means for expanding and drawing the tubing in the machine and transverse direction after passage through the annular knife-edge.

By the term "line" contact as used in the present specification and claims is meant a type of contact characterized by minimum vertical extension along the surface of the tubing such as would be obtained with a sharp or knife-edge contact.

It is an essential feature of our invention that the extruded thermoplastic tubing is maintained at a substantially constant diameter, i.e., substantially unexpanded from the time of emergence from the forming die orifice to the time of passage through the annular knife-edge. While traversing the distance between these spaced-apart shaping means the substantially unexpanded extruded tubing is cooled from extrusion temperature to a temperature within the orientation temperature range either by ambient air or a forced stream of coolant. Thus, there is no appreciable film expansion until the tubing has reached a suitable temperature for orientation. The result is greater permanent orientation in the film produced. In this invention, the permanent orienting effect of stretching is not lost by the tubing being too hot while undergoing expansion. This improved degree of orientation has not been achieved heretofore because in prior art methods the tubing has been expanded immediately upon emergence from the forming die. Blasts of chilled air directed at the extrudate at the point of extrusion cannot cool the film quickly enough to prevent wasted unretained stretching without the use also of the annular knife-edge of this invention because even as the air blast impinges on the film, stretching of thermoplastic heated to temperature above orientation temperature range has already begun.

The invention is more fully described hereinbelow in conjunction with the attached drawings wherein.

Figure 1:
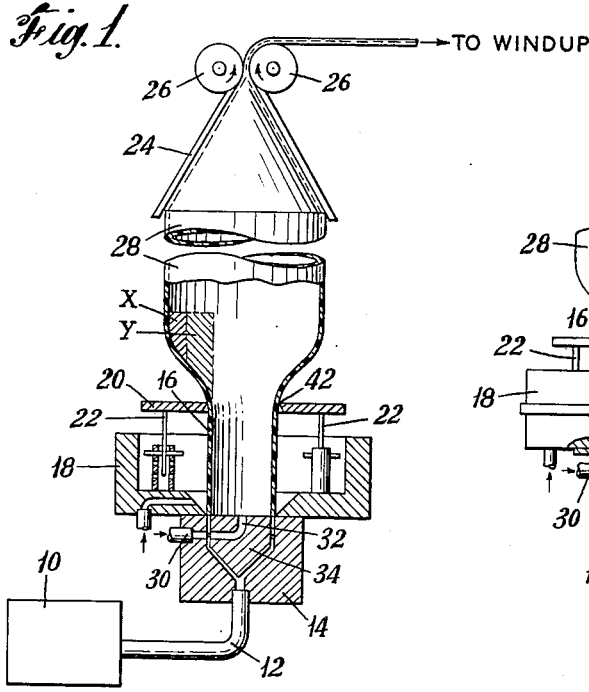
FIG. 1 is a partly diagrammatic sectional view of the tube extruding unit of one preferred embodiment of the invention.

Referring now to the drawings where like reference numerals indicate like parts a preferred embodiment is shown in FIG. 1 of the improved apparatus for biaxially stretching and orienting extruded thermoplastic tubing. The apparatus comprises an extruder 10, a 90° elbow bend 12 through which molten thermoplastic resin is fed to annular die 14 which forms the molten thermoplastic into tubing 16. Preferred means for circumferentially cooling the tubing 16 as it emerges from annular die 14 and before expansion takes place are provided by cooling fluid from air ring 18 which impinges on the tubing surface. Other means for cooling the hot tubing, for example, ambient air, can also be used. Spaced above and coaxial with the annular die 14 is an annular knife-edge 20 adjustably mounted on supports 22. The annular knife-edge 20 is a rigid ring or block, suitably of metal such as steel, having a round opening formed by an inwardly directed circular knife-like edge 42 which bears on a line against the tubing 16 passing therethrough. A standard collapsing frame 24 and nip rolls 26 which withdraw the tubing 16 from the annular die 14 and annular knife-edge 20 therebelow are provided to collapse the tubing 16 which is then fed to a windup apparatus (not shown). A bubble generally indicated at 28 is formed in the tubing 16 above the annular knife-edge 20 by maintaining in the tubing 16 a fluid medium introduced thereinto suitably through inlet 30 in annular die 14 and passageway 32 in die pin 34.

The geometry of edge 42 of annular knife-edge 20 is of critical importance in the apparatus of the present invention. It is essential that the edge 42 be sufficiently sharp to present a line contact as above defined in bearing against the tubing 16 passing therethrough. The reason for the essentiality of this line contact is found in the nature of the present method. To accomplish the improved orientation of this invention, i.e., maximum permanent orientation after stretching, the tubing must be expanded as much as possible after passage through the annular knife-edge 20 and preferably not at all, before such passage. Control over the point of expansion can be difficult where a coaxial fluid medium source, such as shown in FIG. 1, is used since pressure above and below the annular knife-edge 20 is equal. Nonetheless, in the method and by the apparatus of this invention control is easily maintained when an annular knife-edge 20 having a sharp edge 42 is employed. Control is believed to be maintained in the following manner: Upon emerging from the forming die 14 the tubing 16 is immediately subjected to a cooling environment suitably a circumferential blast of chilled air, which freezes the surface or "casehardens" the tubing. Such case-hardened tubing does not readily expand. Then, as the tubing passes through annular knife-edge 20, the sharp edge 42 thereof bears against the hardened tubing surface and exerts a tremendous local pressure on the surface, generating great amounts of frictional heat. This heat softens the tubing surface as the tubing passes above the annular knife-edge 20. The now softer-surfaced tubing expands readily. Hence, the tubing 16 expands above and not below the annular knife-edge 20.

While not wishing to be bound by the above theoretical explanation of the control of point of tubing expansion since it is not the only conceivable explanation or necessarily the entire explanation for the phenomenon we have observed in carrying out the method of this invention.

Figure 3A:
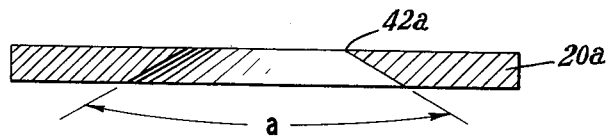
FIGS. 3A and 3B are sectional views of modifications in included angle and surface smoothness of the annular knife-edge.
Figure 3B:
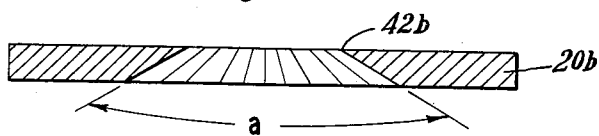

It can be seen from the foregoing how important the geometry of the edge 42 is. If the edge 42 is too broad, the force exerted is more widely distributed and local pressure is reduced, sufficient frictional heat is not developed and erratic expansion results. Although absolute limits for all thermoplastics, and rates and temperatures of extrusion can not be set down, as a general rule the edge 42 should be such as will include an "a" angle of from 6° to about 150° when fabricated in the manner shown in FIG. 3A, i.e., at the top of annular knife-edge 20. The surface of edge 42 can be modified, e.g., knurled as shown in FIG. 3B to give special effect and properties to the film.

The edge 42 can not have a radius of curvature. Such a contour results in the tubing bending around the edge 42, above and below it, with consequent hanging up and tearing of the film, resulting in loss of inflating fluid and shutdown of the equipment. Also a curved edge does not generate sufficient heat to warm the surface of tubing 16 to a temperature suitable for easy expansion.

As a result of the cooling environment and the annular knife-edge 20 the tubing 16 is maintained essentially unexpanded until after passage through the knife-edge. The term "essentially unexpanded" in the present specification and claims means that the tubing does not at any time exceed the die orifice diameter by more than about 50% in transversing the distance from the die orifice to the annular knife-edge. Put in terms of apparatus the annular knife-edge 20 is substantially equal in diameter to the die orifice i.e., the annular knife-edge does not exceed the die orifice diameter by more than 50%. The tube diameter will not remain absolutely constant because of occasional surges of fluid medium or movement of the bubble or variations in draw speed or film thickness.

The slight increase in tube diameter permitted by using an annular knife-edge 20 greater in diameter than the die orifice is not to be confused with expansion of tubing in prior art methods. In this method the tubing remains essentially cylindrical, in prior art methods the tubing assumes a conical shape immediately upon emergence from the die orifice. The annular knife-edge is preferably heated, e.g., with electrical resistance heaters, to increase the coefficient of friction to the film tube. Preferred knife-edge temperatures are within or close to the orientation temperature range of the thermoplastic being extruded and stretched, e.g., with polystyrene the annular knife-edge is heated to 110° to 150° C. The use of more than one annular knife-edge to enable great distances to be traversed before blowing the bubble is within the scope of this invention. The annular knife-edge can be positioned above or below or in a horizontal line with the extruder for vertical upward, vertical downward or horizontal extrusion respectively.

After the tubing 16 has passed the edge 42, it is inflated to form bubble 28 by being drawn over a quantity of fluid medium such as air, nitrogen, argon or the like trapped between nip rolls 26 and annular knife-edge 20.

The annular knife-edge 20 is positioned in such a manner that the stationary bubble 28 develops entirely above the knife-edge. The distance between the annular die 14 and the annular knife-edge 20 can be varied within rather wide limits, the controlling factor being the need to maintain the portion of the tubing below the annular knife-edge in an essentially unexpanded state. Distances from 1 to 36 inches during continuous operation have been found entirely suitable and are preferred. Distances from 6 to 20 inches are particularly preferred. Ordinarily, start-up is facilitated by having a minimum distance between the die and the knife-edge. Then, after the bubble is blown, the knife-edge is raised to the desired height. Factors to be considered in determining final height are extrudate temperature and extrudate thickness; the greater these are the more distance is needed to get sufficient cooling. Of course, the cooling rate depends on whether only ambient air is being used or forced coolant and if the latter, at what temperature and velocity.

The tubing 16 is stretched in both the transverse and machine directions by being inflated above the annular knife-edge, lateral stretching being imparted by the trapped fluid medium and longitudinal stretching by the pulling force of nip rolls 26. In FIG. 1 there is shown graphically the improved degree of orientation obtained by the use of the annular knife-edge of the present invention. Conventional tubular film orientation procedures expand the tubing before the orientation temperature range is reached. As a consequence only the latter portion of the expanded tubing, which is the only part sufficiently cool, is permanently oriented. This is shown as Zone X in FIG. 1. In contrast to this result, use of the annular knife-edge of this invention permits expansion only after all the tubular film has reached the orientation temperature range. Since the entire film is at an orientable temperature, more orientation is obtained for the same amount of stretch, i.e., for the same ratios of bubble diameter to annular knife-edge diameter and drawspeed to extrusion rate. Thus, with the apparatus of this invention permanent orientation is obtained in both Zone X and Zone Y.

Figure 2:
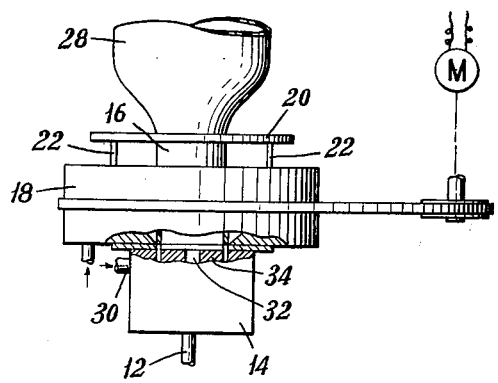
FIG. 2 is an elevational view partly broken away to show underlying parts of the tube extrusion apparatus and illustrating a rotatable air ring and annular knife-edge.

A preferred embodiment of the apparatus of this invention is shown in FIG. 2 where the air ring 18 and/or the annular knife-edge 20 rotate slowly about the axis of the die orifice, e.g., about ½ to 2 revolutions per minute. Rotation of both the air ring 18 and the knife-edge 20 results in more uniform cooling of the tubing and more even distribution of frictional heat as the tubing passes edge 42 of annular knife-edge 20.

Resins which can be biaxially oriented by the method of the present invention are the extrusion grades of thermoplastic resins which are capable of forming self-supporting films. Among the commercially more important resins which can be biaxially oriented to an improved degree by the instant method and apparatus are the extrusion grades of homopolymers and copolymers of olefins particularly polyethylene and polypropylene and ethylene-propylene copolymers; vinyl including vinyl chloride, and styrene particularly polystyrene. Extrusion grades of polycarbonate and polyhydroxyether polymers are also suitable.

To illustrate the method of carrying out the method of this invention using the apparatus of FIG. 2 the following example is given. After the example there is given a comparison of the results of numerous standard tests with film oriented by our method and apparatus and film oriented in an exactly similar manner but without the annular knife-edge.

The resin used was an extrusion grade polystyrene having a molecular weight of about 60,000. Conditions of the extrusion were:

| | |
|---|---|
| Die temperature | 156° C. |
| Air cooling | Ca. 1000 cubic feet/minute at 25° C. |
| Extrudate temperature at die orifice | 185° C. |
| Below knife-edge | 150° C. |
| Above knife-edge | 155° C. |
| Extrusion rate | 152 pounds/hour.[1] |
| Drawspeed | 44 feet/minute. |
| Die diameter | 5 inches. |
| Annular knife-edge diameter | 4.5 inches. |
| Bubble diameter | 33.5 inches. |
| Bubble diameter/tube diameter ratio | Ca. 7.5/1. |
| Bubble shape | Tulip-shaped. |
| Film thickness | 0.001 inch. |
| Rotation—Air ring and knife edge | ½ revolution/minute. |

[1] An added advantage of the present invention is the possibility of effective film orientation although extruding at very high, economically advantageous temperatures. E.g. extrusion of this resin at 160° C. in this equipment would mean a rate of only 60 pounds/hour. With this invention, however, more than twice that extrusion rate, 152 pounds per hour is achieved with no loss in orientation obtained.

Comparison testing of the film made above, with a film made identically except without the annular knife-edge appears in the table below.

| Test | Without Annular Knife-Edge | | With Annular Knife-Edge | |
|---|---|---|---|---|
| | M.D. | T.D. | M.D. | T.D. |
| Tensile p.s.i. (ASTM D-882-56T) | 8,340 | 7,900 | 10,400 | 10,320 |
| Elongation, percent (ASTM D-882-56T) | 3 | 3 | 3.0 | 3.0 |
| Graves tear, lbs./in. (ASTM D-1004-49T) | 312 | 245 | 321 | 317 |
| Tensile impact, ft-lbs./in.³ | 40.2 | 49.2 | 93 | 77 |
| Specular light transmission (ASTM D-1003-52) | 85 | | 85 | |
| Specular gloss/mil (ASTM D-523-537) | 192 | | 192 | |
| Shrinkage, 90° C. percent | 0 | 0 | 0.2 | 0 |
| Shrinkage, 100° C. do | 2.7 | 3.3 | 8 | 7 |
| Shrinkage, 110° C. do | 44.3 | 37.3 | 50 | 49 |
| Shrinkage, 125° C. do | 64.7 | 56 | 73 | 74 |

The increased amount of retained orientation realized with the annular knife-edge is evidenced by the improved physical properties, especially heat shrinkability, tensile strength and impact strength.

Tensile impact measures the short term tensile strength of a film sample by suspending a striking plate by a 3" x 1" x 1" film sample and hittting the plate with measured blows in a direction parallel to the long dimension of the sample.

What is claimed is:

1. In a method for biaxially orienting thermoplastic film comprising extruding thermoplastic tubing and drawing and expanding the tubing in the machine and transverse direction, the improvement which comprises maintaining the extruded thermoplastic tubing essentially unexpanded for a distance from the die orifice and simultaneously subjecting the tubing to a cooling environment and peripherally contacting and frictionally heating the tubing with an annular knife-edge substantially equal in diameter to the die orifice in a plane parallel to and spaced said distance from said die orifice said distance being sufficient to permit the tubing to be cooled to within the orientation temperature range thereof.

2. In a method for biaxially orienting thermoplastic film comprising extruding thermoplastic tubing and drawing and expanding the tubing in the machine and transverse direction, the improvement which comprises maintaining the extruded thermoplastic tubing essentially unexpanded for a distance of from 1 to about 36 inches from the die orifice and simultaneously circumferentially cooling the tubing with forced coolant and peripherally contacting the tubing with a heated annular knife-edge substantially equal in diameter to the die orifice in a plane parallel to and spaced said distance from said die orifice, said distance being sufficient to permit the tubing to be cooled to within the orientation temperature range thereof.

3. In a method for biaxially orienting thermoplastic film comprising extruding thermoplastic tubing and drawing and expanding the tubing in the machine and transverse direction, the improvement which comprises maintaining the extruded thermoplastic tubing at a diameter equal to the diameter of the die orifice for a distance of from 6 to 20 inches from the die orifice and simultaneously circumferentially cooling the tubing with forced air coolant and peripherally contacting the tubing with a rotating annular knife-edge equal in diameter to the die orifice in a plane parallel to and spaced said distance from said die orifice, said distance being sufficient to permit the tubing to be cooled to within the orientation temperature range thereof.

4. In a method for biaxially orienting thermoplastic films comprising vertically upwardly extruding thermoplastic tubing and drawing and expanding the tubing in the machine and transverse direction, the improvement which comprises maintaining the extruded tubing at a diameter no greater than 150% of the die orifice diameter for a distance of from 6 to 20 inches from the die orifice and simultaneously circumferentially cooling the tubing with forced chilled air and peripherally contacting the tubing on a line with a heated annular knife-edge rotating at from ½ to 2 revolutions per minute and having a diameter no greater than 150% of the die orifice diameter in a plane parallel to and spaced said distance from the die orifice, said distance being sufficient to permit the tubing to be cooled to within the orientation temperature range thereof.

5. In apparatus for biaxially orienting thermoplastic film comprising an extruder fitted with a die having an annular orifice for forming thermoplastic tubing, means for cooling the tubing to a temperature within the orientation temperature range and means for drawing and expanding the tubing in the machine and transverse direction, the improvement which comprises an annular knife-edge substantially equal in diameter to said die orifice positioned between said cooling means and said drawing and expanding means, circumscribing the tubing and adapted to bear against the periphery thereof in a line contact.

6. In apparatus for biaxially orienting thermoplastic film comprising an extruder fitted with die having an annular orifice for forming thermoplastic tubing, means for force cooling the tubing to a temperature within the orientation temperature range, and means for drawing and expanding the tubing in the machine and transverse direction, the improvement which comprises a heated annular knife-edge substantially equal in diameter to said die orifice positioned between said cooling means and said drawing and expanding means a distance of from 1 to 36 inches from said die orifice, circumscribing the tubing and adapted to bear against the periphery thereof in a line contact.

7. In an apparatus for biaxially orienting thermoplastic film comprising an extruder fitted with a die having an annular orifice for forming thermoplastic tubing, means for force cooling the tubing to a temperature within the orientation temperature range, and means for drawing and expanding the tubing in the machine and transverse direction, the improvement which comprises a rotating annular knife-edge equal in diameter to said die orifice positioned between said cooling means and said drawing and expanding means a distance of from 6 to 20 inches from said die orifice, circumscribing the tubing and adapted to bear against the periphery thereof in a line contact.

8. In an apparatus for biaxially orienting thermoplastic film comprising an extruder fitted with a die having an annular orifice for forming thermoplastic tubing, means for force cooling the tubing to a temperature within the orientation temperature range, and means for drawing and expanding the tubing in the machine and transverse direction, the improvement which comprises a heated rotating annular knife-edge having an included angle of from 6 to 150° and a diameter not greater than 150% of said die orifice diameter positioned between said cooling means and said drawing and expanding means a distance of from 6 to 20 inches from said die orifice, circumscribing the tubing and adapted to bear against the periphery thereof in a line contact.

References Cited in the file of this patent

UNITED STATES PATENTS

| | | |
|---|---|---|
| 2,423,260 | Slaughter | July 1, 1947 |
| 2,952,874 | Doyle | Sept. 20, 1960 |